Sept. 6, 1927.

W. H. PIERCE

FASTENER

Filed Nov. 18, 1924

1,641,901

Inventor:
Walter H. Pierce,
by Emery Booth Janney Varney
Attys

Patented Sept. 6, 1927.

1,641,901

UNITED STATES PATENT OFFICE.

WALTER H. PIERCE, OF WATERTOWN, MASSACHUSETTS, ASSIGNOR TO CARR FASTENER COMPANY, OF CAMBRIDGE, MASSACHUSETTS, A CORPORATION OF MAINE.

FASTENER.

Application filed November 18, 1924. Serial No. 750,595.

This invention aims to provide an improved separable fastener.

In the drawings, which illustrate two preferred forms of my invention:—

Figure 1:
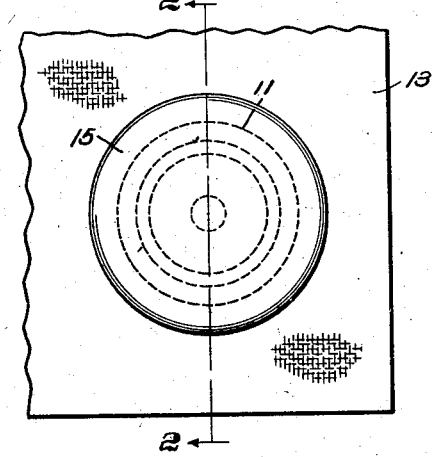
Figure 1 is a front elevation of the fastener, showing some of the underlying portions in dotted lines.
Figure 2:
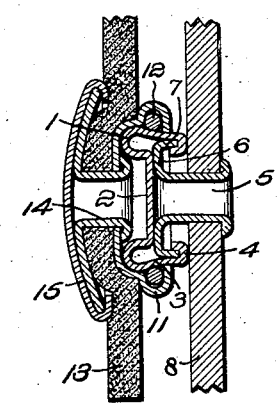
Fig. 2 is a section on the line 2—2 of Fig. 1.
Figure 3:
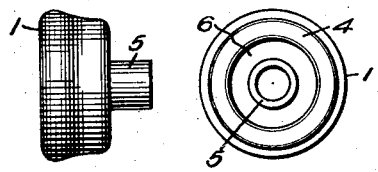
Figure 4:
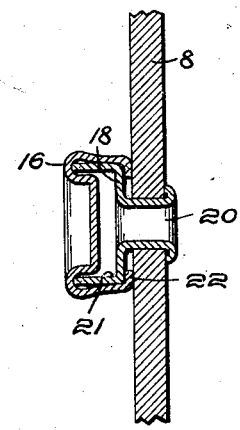

Fig. 3 includes a side and a rear elevation of the stud shown in Figs. 1 and 2; and Fig. 4 is a section through the second preferred form of stud as it appears when secured to a support.

Referring to the drawings, I have shown a snap fastener which includes a simple, durable and inexpensive stud which is particularly, though not exclusively, useful for cooperating with a socket to secure a carpet to a metal floor board of an automobile or the like.

The stud illustrated in Figs. 1, 2 and 3 comprises a socket-engaging cap member and an attaching member for securing the cap member to a suitable support. The cap member is pressed from a single piece of metal and presents a head 1, presenting a peripheral bead, a central depression 2 in said head, a neck 3 and a flange portion 4. The attaching part comprises a tubular rivet portion 5 pressed from a single piece of metal and presents a cup-shaped portion 6 having a flange portion presenting a depending outer peripheral wall 7. When the cap member and attaching part are secured together, the flange cup-shaped portion 6 of the attaching part is seated against the central depressed portion 2 of the head and the flange portion 4 of the cap is crimped over the edge of the depending wall 7. Thus, the rivet portion 5 of the attaching part extends beyond the cap member and is back-supported by the central depressed portion 2 of the head 1.

The stud support 8 may be the sheet metal side of an automobile or a sheet metal floor and the stud may be secured thereto by the tubular rivet portion 5 which passes through an aperture in the metal support 8 and is then clenched against the inner face of the support, as shown in Fig. 2. Thus I have provided a stud that is seated against the metal support and is back-supported by the attaching part so that it will withstand normal pressures exerted thereupon, especially when secured to metal floors.

The socket which I have shown comprises a casing 11 containing a spring 12 for engagement with the neck 3 of the stud. This socket may be secured to the socket-carrying medium 13 in any suitable manner, but I prefer to secure it thereto by an attaching rivet 14 secured to a cap 15 located at the opposite side of the carrying medium 13. The rivet extends through the carrying medium through an aperture in the socket casing and is then clenched against the casing, as illustrated in Fig. 2. When the stud and socket are engaged, the clenched over portion of the rivet 14 enters the central depression 2 in the cap of the stud.

Referring now to the second form of my invention illustrated in Fig. 4, I have shown a stud which includes a cap member 16, substantially as shown and described in connection with the first form of my invention, and an attaching part. The attaching part is provided with a cup-shaped portion 18 and a rivet portion 20, but in this instance the cup-shaped portion faces in the opposite direction from that of the first form. Thus the peripheral wall 21 extends toward the head of the stud, and passes between the depressed central portion 2 and the neck 3 of the cap member and seats against the head of the stud, and the flange 22 of the cap member is clenched against the cup-shaped portion 18 of the attaching part to hold both parts of the stud in assembled relation. Attachment of the stud to the support is the same as described relative to the first mentioned form of my invention.

While I have shown and described two forms of my invention, it will be understood that I have done so for clarification merely, my invention being best defined in the following claims.

Claims:

1. A fastener stud comprising, in combination, a cap member having a head, a neck and a flange portion, a cooperating attaching member having a flange portion and a wall portion projecting from the outer periphery of the flange portion to provide a cup-shaped part, and an attaching part projecting from said cup-shaped part, one of said portions of the cup-shaped part cooperating with the head of the cap and the other portion cooperating with the flange of said cap to support said attaching part.

2. A fastener stud comprising, in combination, a cap member having a head, a neck and a flange portion, and a cooperating attaching rivet normally assembled with and carried by said cap member, said rivet presenting a cup-shaped portion back-supported by a portion of said head and held in assembly with said cap member by said flange.

3. A fastener stud comprising, in combination, a cap member having a head and a neck, a cooperating rivet presenting a cup-shaped portion enclosed by said cap member and a tubular attaching portion extending beyond said cap member, said cap member having a flange extending inwardly from said neck to engage said cup-shaped portion and secure said rivet and cap member as a unit prior to attachment of the rivet to a stud-carrying support.

4. A fastener stud comprising, in combination, a cap member having a head, a neck, and a flange portion, a cooperating attaching part including a cup-shaped portion and a rivet portion, said cup-shaped portion being supported by the flange and head of said cap member, the rivet portion extending beyond said cap member from the bottom of said cup-shaped portion to secure said stud to a suitable stud support.

5. A fastener stud comprising, in combination, a cap member having a head, a depression formed in said head, a peripheral wall providing the neck of the stud and a cooperating attaching part normally assembled with said cap member, prior to attachment to a suitable carrying medium, said attaching part comprising a cup-shaped portion having its outer peripheral wall extending between the wall providing the neck of the stud and the wall of the depression, and having its free edge seated against the inner surface of said head and a hollow rivet portion extending from said cap-shaped portion and back supported thereby when being upset to secure the stud to the carrying medium.

6. A fastener stud comprising a cap-shaped portion presenting a head, a neck and a base portion, said neck and said base portion being smaller in diameter than said head, and a rivet-presenting part normally assembled with said cap-shaped part prior to attachment to a stud support, the assembly being made by turning a portion of one part over and against the other part, and the free end of said rivet-presenting part extending from the base of said stud part.

In testimony whereof, I have signed my name to this specification.

WALTER H. PIERCE.